United States Patent [19]

Jung et al.

[11] Patent Number: 5,018,804
[45] Date of Patent: May 28, 1991

[54] LASER PICK-UP

[75] Inventors: Seung T. Jung, Kwachun; Soo H. Park, Suwon; Chun K. Kim, Yongin-Gun, all of Rep. of Korea

[73] Assignee: Samsung Electronic Co., Ltd., Suwon, Rep. of Korea

[21] Appl. No.: 459,296

[22] Filed: Dec. 29, 1989

[30] Foreign Application Priority Data

Dec. 31, 1988 [KR] Rep. of Korea ............... 88-22370

[51] Int. Cl.$^5$ ............................................. G02B 26/10
[52] U.S. Cl. ................................... 350/3.71; 350/3.7; 250/201.5
[58] Field of Search ............... 350/3.7, 3.71, 3.72, 350/252; 250/201.5; 369/45

[56] References Cited

U.S. PATENT DOCUMENTS

| 4,641,296 | 2/1987 | Mizunoe et al. | 369/46 |
| 4,784,447 | 11/1988 | Latta et al. | 350/3.7 |
| 4,789,977 | 12/1988 | Oudenhuysen et al. | 350/3.72 |
| 4,829,506 | 5/1989 | Bressers et al. | 350/3.72 |
| 4,904,856 | 2/1990 | Nagahama et al. | 369/46 |
| 4,907,847 | 3/1990 | Onayama et al. | 350/3.72 |

Primary Examiner—Bruce Y. Arnold
Assistant Examiner—J. P. Ryan
Attorney, Agent, or Firm—Kenyon & Kenyon

[57] ABSTRACT

A laser pick-up device for an optical disk receives three laser beams to irradiate the optical disk and uses a six-division optical detector to detect the laser beams reflected from the optical disk and to track exactly the optical disk. A reflection type diffraction grating is positioned at a front position in order to divide and reflect the laser beam generated by a laser diode. A holographic element having the function of a toric lens is used as a diffracting device for the reflected beams. The six-division optical detector is positioned to one side and/or behind the diffraction grating. The grid gaps of the holographic element can be larger using the present invention which simplifies the manufacturing the holographic element and thereby provides a laser pick-up device that is suitable for mass production.

4 Claims, 2 Drawing Sheets

LASER PICK-UP

FIELD OF THE INVENTION

The present invention relates to a laser pick-up for writing and regenerating optical information data to and from an optical disk, and more particularly to a laser pick-up using a reflection type diffraction grating and a holographic optical element.

BACKGROUND OF THE INVENTION

A laser pick-up is generally a device for writing and regenerating data of optical information to and from an optical disk by irradiating the optical disk with laser beams from a laser diode. FIG. 1 shows a conventional laser pick-up. This laser pick-up is constructed such that diffraction grating 52, a 50% reflecting mirror 53 and toric lens 56 are positioned in the optical path. Diffraction grating 52 divides the laser beams from laser diode 51 into three beams (0 order and ± first orders). These beams are reflected from the 50% reflecting mirror 53 and are irradiated through an objective lens 54 to optical disk 55, thereby forming a focal spot on the optical disk 55. The beams which have formed a focus on optical disk 55 are reflected back in the reverse direction through 50% reflecting mirror 53 and toric lens 56 based on the principle of astigmatism to ultimately reach optical detector 57. Optical detector 57 detects the focus error occurred on optical disk 55 by calculating the difference between the amounts of the beams that have reached the 4 sub-parts of the detector.

Among the drawbacks of the laser pick-up arrangement described above is that 50% reflecting mirror 53 and toric lens 56 are disposed at the center of the body of the laser pick-up assembly. This arrangement makes the adjustment of the optical axis relatively difficult. In addition, the requisite number of the components is increased.

The laser pick-up arrangement illustrated in FIG. 2 was proposed to overcome these disadvantages. This arrangement includes holographic element 58 which functions as a toric lens. However, collimating lens 59 is required to make the laser beams from laser diode 51 run parallel. Moreover, using a 3-beam type pick-up arrangement to detect the tracking errors means that there will be three beams reflected after forming a focal spot on optical disk 55. Each of the beams are divided into three beams due to diffraction caused by holographic element 58 so that a total of nine laser beams reach the optical detector 57.

A further laser pick-up arrangement was designed in an attempt to resolve the problems described above. This arrangement, illustrated in FIG. 3, provides holographic element 58 and diffraction grating 52 as separate components. However, the angle between the optical axis and diffracted beams 60 from the holographic element is larger in this arrangement. The result should be that the grid gaps of the holographic element 58 are narrowed, thereby rendering the manufacture of the holographic element difficult.

Therefore, there is a need to provide a laser pick-up arrangement that minimizes the number of components and permits larger grid gaps in the holographic element to be used.

SUMMARY OF THE INVENTION

The present invention is directed to a laser pick-up arrangement that avoids the problems and disadvantages of the prior art. The invention accomplishes this goal using a laser pick-up device for an optical disk comprising a laser diode for generating a beam of laser light, a reflection-type diffraction grating that divides and reflects the light from the laser diode, a lens for focusing the light and collecting light from the optical disk, a holographic optical element that functions as a toric lens and as a diffracting device for the reflected light, and a six division optical detector positioned behind the holographic optical element to receive the reflected light.

The device of the present invention is constituted such that the optical disk is irradiated by the three laser beams and the reflected laser beams are detected using an optical detector having 6 sub-parts. The tracks of the optical disk should be scanned exactly to form a three-beam type laser pick-up. In this laser pick-up, a narrow reflection type diffraction grating is used as the dividing and reflecting means for the laser beams, while a holographic optical element that functions as a toric lens is used as the diffracting means for the reflected beams.

The present invention enables the diffracting angle of the first diffracted beams to be small so that the grid gaps of the holographic optical element can be enlarged. Accordingly, the manufacture of the holographic optical element can be simplified, thereby increasing manufacturing efficiencies and reducing manufacturing costs.

DETAILED DESCRIPTION

Figure 4A:
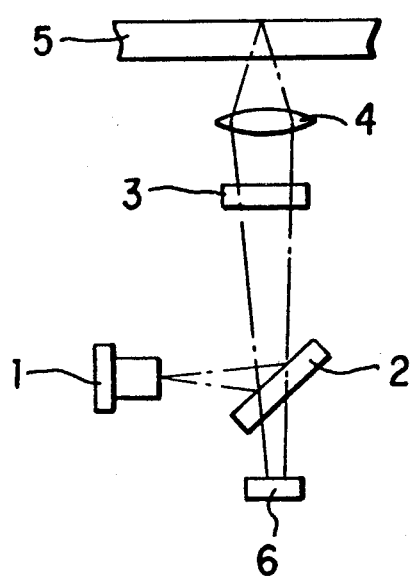
FIG. 4A is a side view of the laser pick-up of the present invention.
Figure 4B:
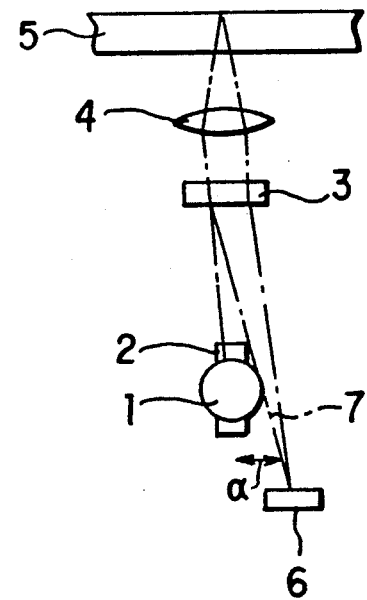
FIG. 4B is a front view of the laser pick-up shown in FIG. 4A.

Referring to FIGS. 4A and 4B, the laser pick-up according to the principles of the invention is arranged such that a laser beam that is generated by and transmitted from laser diode 1 is divided into three beams that are reflected onto optical disk 5. Reflection type diffraction grating 2 has a narrow width and is positioned in the beam path near laser diode 1. Holographic optical element 3 functions as a toric lens and is positioned between objective lens 4 and reflection type diffraction grating 2 in the optical path of the laser beam reflected from optical disk 5. Optical detector 6 is positioned at the lower right end of the reflection type diffraction grating 2.

The operation of the laser pick-up according to the present invention is described hereafter with reference to FIGS. 4A and 4B. The laser beam generated by laser diode 1 is reflected after being divided into three beams when passing through reflection type diffraction grating 2. The laser beams reflected from reflection type diffraction grating 2 pass through holographic optical element 3 and objective lens 4 before they reach optical disk 5 where they form focal spots. After the formation of the focal spots, the beams again pass through objective lens 4 to reach holographic optical element 3.

Upon reaching holographic optical element 3, the laser beams are divided into diffracted beams of 0 order, ± first order and ± second order by holographic optical element 3. The 0 order beam advances along the optical axis toward laser diode 1 after being reflected from the reflection type diffraction grating 2. Only the positive first order diffracted beam 7 arrives to the optical detector 6.

Figure 1:
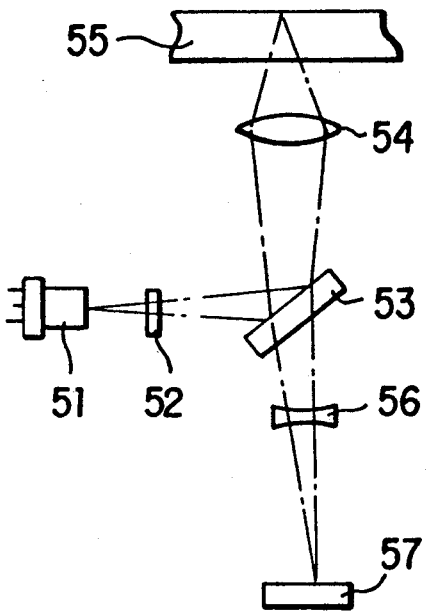
FIG. 1 is a schematic view of a conventional laser pick-up.
Figure 2:
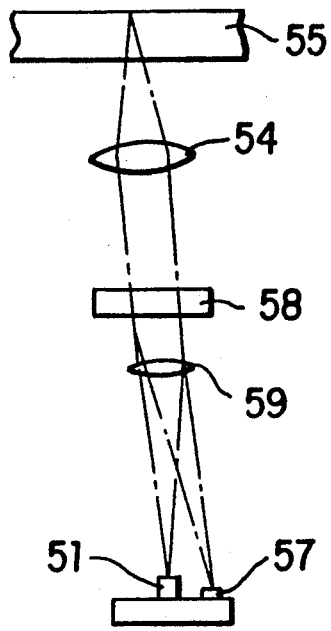
FIG. 2 is a schematic view of another conventional laser pick-up in which a conventional holographic optical element is used.
Figure 3:
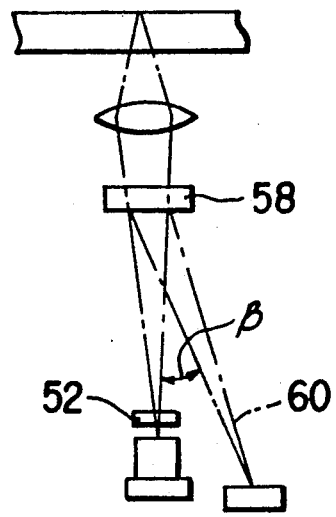
FIG. 3 is a schematic view of still another conventional laser pick-up in which a conventional holographic optical element is used.

Under this condition, the diffracting angle of the positive first order diffracted beam 7 is very small due to because the width of the reflection type diffraction grating is very narrow. An actual value of the diffracting angle can be calculated as set forth below. If it is assumed that the radius of laser diode 1 is 3 mm, and that the vertical distance between holographic optical element 3 and optical detector 6 is 20 mm then, angle between the optical axis and the diffracted beam 60 for the conventional case of FIG. 3 should be at least = arctan (3/20), i.e., at least 8.5°.

On the other hand, in the case of the present invention, if it is assumed that the half width of the laser beam reflection type diffraction grating 2 is 1 mm, the positive first order diffracted beam 7 has only to be at least = arctan (1/20), i.e., at least 2.9°, with the result that the grid gaps of the holographic optical element 3 become larger since the grid gaps of the holographic element 3 are inversely proportional to the diffracting angle when the diffracting angle is small.

The grid pattern of holographic optical element 3 is formed so that it can function as a toric lens. It is therefore possible that the zeroth order diffraction beam of the reflection type diffraction grating can detect the focal distance, and the positive first order diffracted beam 7 which arrives to the optical detector 6 can detect the tracking errors by analyzing the difference in the amounts of the beams.

The laser pick-up device of the present invention described above adopts a three-beam type tracking error detecting method using the reflection type diffraction grating. Therefore, conventional three-beam type electronic circuits can be used without modification. Further, manufacturing the holographic element is simplified because the grid gaps of the holographic optical element are larger. The laser pick-up construction is thus suitable for mass production.

What is claimed is:

1. A laser pick-up device, for an optical disk comprising:
    a laser diode for generating a beam of laser light;
    a reflection-type diffraction grating that divides and reflects the light from the laser diode;
    a lens for focusing the light and collecting light from the optical disk;
    a holographic optical element that functions as a toric lens and as a diffracting device for the reflected light; and
    a six-division optical detector positioned behind the holographic optical element to receive the reflected light.

2. The laser pick-up device of claim 1 wherein the six-division optical detector is laterally spaced from the diffraction grating.

3. The laser pick-up device of claim 2 wherein the six-division optical detector is positioned behind the diffraction grating.

4. The laser pick-up device of claim 1 wherein the six-division optical detector is positioned behind the diffraction grating.

* * * * *

UNITED STATES PATENT AND TRADEMARK OFFICE
CERTIFICATE OF CORRECTION

PATENT NO. : 5,018,804

DATED : May 28, 1991

INVENTOR(S) : Seung T. Jung, et al.

It is certified that error appears in the above-identified patent and that said Letters Patent is hereby corrected as shown below:

| Column | Line | |
|---|---|---|
| Abstract | 14 | Before "the holographic" insert --of--. |
| 3 | 11 | After "angle" insert -- α --. |
| 3 | 13 | Delete "because"; before "width" insert --fact that the--. |
| 3 | 18 | After "20 mm" insert -,--; after "then" delete "," and insert --the--. |
| 3 | 20 | After "at least" insert -- β --. |
| 3 | 25 | After "at least" insert -- α --. |

Signed and Sealed this

Twenty-third Day of March, 1993

*Attest:*

STEPHEN G. KUNIN

*Attesting Officer*      *Acting Commissioner of Patents and Trademarks*